(12) United States Patent
Fahrenthold

(10) Patent No.: US 8,725,163 B2
(45) Date of Patent: May 13, 2014

(54) SYSTEM AND METHOD FOR LOCATING A VOICE OVER INTERNET PROTOCOL (VOIP) DEVICE USING A GEOMAGNETIC SENSOR

(75) Inventor: Kyle W. Fahrenthold, Princeton, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1215 days.

(21) Appl. No.: 12/057,147

(22) Filed: Mar. 27, 2008

(65) Prior Publication Data

US 2009/0247183 A1 Oct. 1, 2009

(51) Int. Cl.
*H04M 11/04* (2006.01)

(52) U.S. Cl.
USPC ................. 455/456.1; 455/404.2

(58) Field of Classification Search
USPC ........ 455/404.1, 404.2, 407, 408, 412.2, 437, 455/456.1; 705/102, 103
See application file for complete search history.

(56) References Cited

U.S. PATENT DOCUMENTS

| | | | |
|---|---|---|---|
| 2006/0293024 A1* | 12/2006 | Benco et al. | 455/404.2 |
| 2007/0030841 A1* | 2/2007 | Lee et al. | 370/352 |
| 2007/0032947 A1* | 2/2007 | Yamada et al. | 701/208 |
| 2007/0049291 A1* | 3/2007 | Kim et al. | 455/456.1 |
| 2007/0121598 A1* | 5/2007 | McGary | 370/356 |
| 2007/0140216 A1* | 6/2007 | Edelmann et al. | 370/352 |
| 2008/0013696 A1* | 1/2008 | Motley et al. | 379/45 |
| 2009/0005070 A1* | 1/2009 | Forstall et al. | 455/456.1 |
| 2009/0168974 A1* | 7/2009 | Mc Cormick | 379/45 |

* cited by examiner

*Primary Examiner* — Ajit Patel
*Assistant Examiner* — Julio Perez

(57) ABSTRACT

Embodiments of the present disclosure are directed to a system and method for receiving first location information associated with a VoIP device having one or more geomagnetic sensor, wherein the first location information is determined using the one or more geomagnetic sensors based at least in part on the Earth's magnetic field, determining second location information associated with the VoIP device based at least in part on the first location information; storing the second location information in one or more databases; and transmitting the second location information to the VoIP device to establish a service.

24 Claims, 3 Drawing Sheets

SYSTEM AND METHOD FOR LOCATING A VOICE OVER INTERNET PROTOCOL (VOIP) DEVICE USING A GEOMAGNETIC SENSOR

BACKGROUND INFORMATION

Many problems exist since the inception of voice over internet protocol (VoIP) user devices, for example, difficulty in locating one or more VoIP user devices. The dynamic determination of the physical location of a VoIP device may be difficult, since the VoIP device may be mobile and roaming. Often, it may be important for a VoIP service provider to determine a location of a VoIP device. For example, the determination of the location of a VoIP device may be important in many situations, such as emergency 911 service originations. In the event that a caller is unable to give an address, emergency services may be unable to locate the caller in any other way. Existing VoIP device location determination methods may be unreliable. For example, a global positioning method (e.g., using a GPS sensor) may be unreliable when the satellite and VoIP device cannot communicate because the VoIP device is located inside a building. Also, the existing VoIP device location determination methods may not provide updated location information to a VoIP service provider in the event that a VoIP user is relocated to a different location after providing first location information. Therefore, an improved location determination method for a VoIP device may be needed in order to obtain an updated/accurate location of the VoIP device.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

These and other embodiments and advantages will become apparent from the following detailed description, taken in conjunction with the accompanying drawings, illustrating by way of example the principles of the various exemplary embodiments.

DETAILED DESCRIPTION OF EMBODIMENTS

A system and method may include various exemplary embodiments for locating a VoIP device via a geomagnetic sensor. The system and method may provide one or more location register messages to a VoIP service provider to identify a location associated with a VoIP device. Also, the system and method may provide one or more location update messages to a VoIP service provider to update a location associated with a VoIP device. Further, the system and method may provide one or more geomagnetic sensors with a VoIP device in order to provide a location associated with the VoIP device.

The description below describes VoIP user agents, VoIP service portals, VoIP service providers and network elements that may include one or more modules, some of which are explicitly shown, others are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. The functions described as being performed at various components may be performed at other components, and the various components may be combined and/or separated. Other modifications also may be made.

Figure 1:
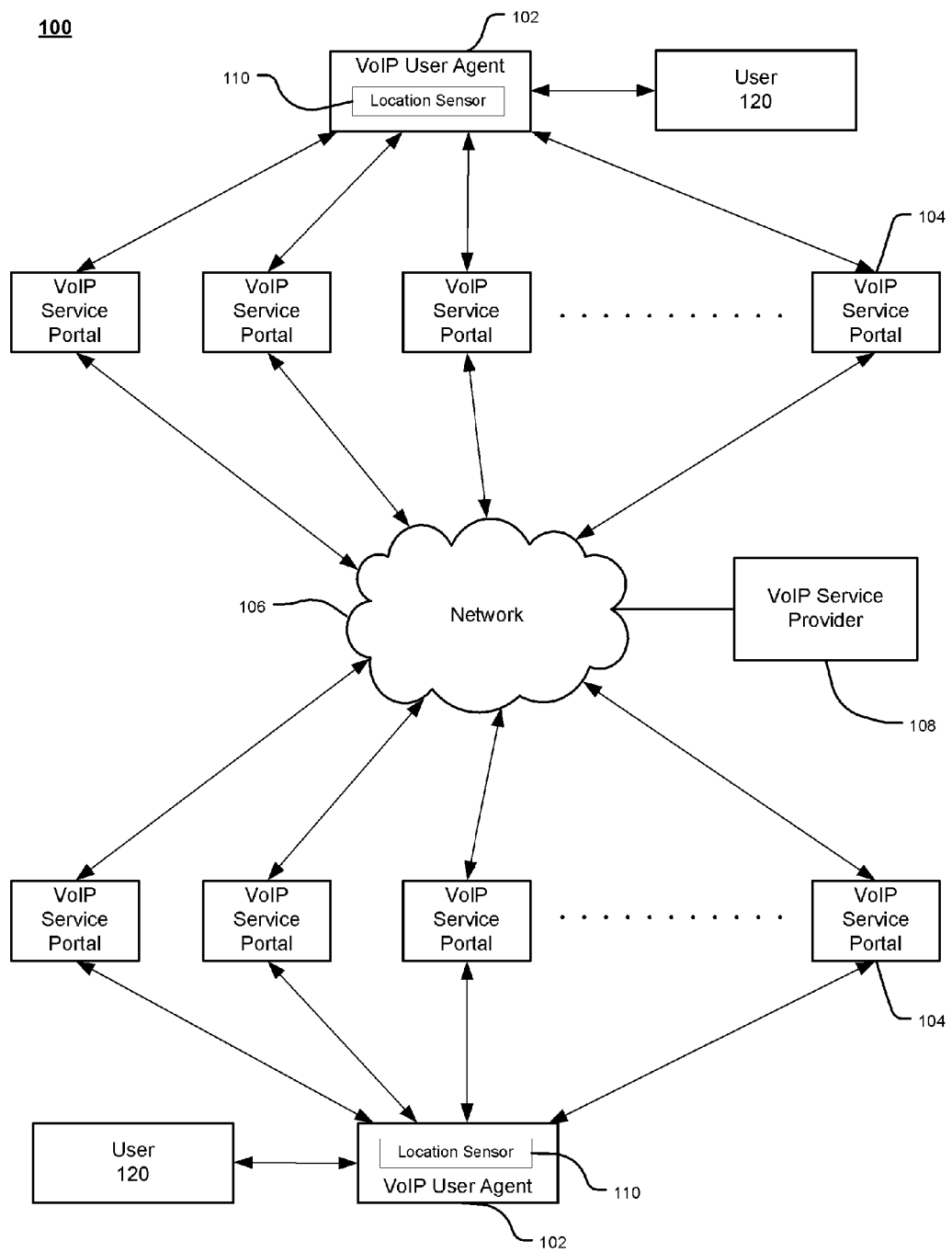
FIG. 1 illustrates a system architecture for locating a VoIP device, in accordance with exemplary embodiments.

FIG. 1 illustrates a system for locating a VoIP device in accordance with exemplary embodiments. In an exemplary embodiment, the system 100 may include one or more mobile VoIP user agents 102, one or more VoIP service portals 104, one or more networks 106, one or more VoIP service providers 108 and a user 120 associated with the one or more mobile VoIP user agents 102. For example, one or more VoIP service portals 104 may be located at disparate locations and/or connected to the one or more VoIP service providers 108 via the one or more networks 106. Each mobile VoIP user agent 102 may be connected to the VoIP service provider 108 via the one or more VoIP service portals 104 located at disparate locations. Further, the one or more mobile VoIP user agents 102 may include a location sensor 110. The one or more mobile VoIP user agents 102 may transmit a Register signal including location information provided by the location sensor 110 to the one or more VoIP service providers 108 to identify a location associated with the one or more mobile VoIP user agents 102.

The one or more VoIP user agents 102 may be, for example, but not limited to, SIP phones, software clients/phones, a desktop computer, a laptop/notebook, a server or server-like system, a module, a telephone, or a communication device, such as a personal digital assistant (PDA), a mobile phone, a smart phone, a remote controller, a personal computer (PC), a workstation, a mobile device, a phone, a handheld PC, a thin system, a fat system, a network appliance, and/or other mobile communication devices that may be capable of transmitting and/or receiving data. Also, the one or more mobile VoIP user agents 102 may include one or more transceivers to transmit one or more signals to the VoIP service provider 108.

Each VoIP user agent 102 may include one or more locations sensors 110. For example, each location sensors 110 may be a geomagnetic sensor utilizing the Earth's magnetic field to determine a location associated with the VoIP user agent 102. In an exemplary embodiment, the geomagnetic sensor may have a metglas/piezoelectric-fiber laminates wrapped in a coil. For example, a core of the geomagnetic sensor may be made from layers of lead zirconium titanate and/or other magnetic material to detect any variations in the Earth's magnetic field strength and/or angle. The one or more location sensors 110 may determine a location associated with the one or more mobile VoIP user agents 102 based at least in part on a giant magnetoelectric effect, where a material may change its electrical properties under an influence of a magnetic field. In an exemplary embodiment, the geomagnetic sensor may match a measurement of the Earth's magnetic field with a database of measurements from across the globe. The measurement of the Earth's magnetic field may include an angle of the Earth's magnetic field and/or a strength of the Earth's magnetic field. The strength of the Earth's magnetic filed may vary across the globe. For example, the Earth's magnetic field is strongest at the poles and is weakest at the equator. Also, the angle of the Earth's magnetic field intersects the Earth's surface may be unique for a particular position across the globe. In another exemplary embodiment, the one or more location sensors 110 may include one or more interfaces to allow a user 120 to input a location of the one or more mobile VoIP user agents 102.

The one or more location sensors 110 may be coupled to or integrated with the one or more mobile VoIP user agents 102. For example, the one or more location sensors 110 may be an external device that couples to and/or communicates with the one or more mobile VoIP user agents 102. The one or more location sensors 110 may be an external device coupled to the one or more mobile VoIP user agents 102 via an interface port which may include, without limitation, USB ports, system bus ports, or Firewire ports and other interface ports. According to another example, the one or more location sensors 110 may be integrated with the one or more mobile VoIP user agents 102. Further, computer code may be installed on the one or more mobile VoIP user agents 102 to control and/or operate a function of the one or more location sensors 110.

The one or more VoIP service portals 104 may be, for example, but not limited to, an Internet service provider router, a telephone adapter, a telephone router, an Ethernet router, a satellite router, a fiber optic router, a co-axial cable router, an Internet router, and/or other routing device that may provide and/or determine a transmission path for data to travel between networks. Furthermore, one or more VoIP service portals 104 may include a computer, software and/or hardware to facilitate a routing and/or forwarding function of a signal.

The one or more networks 106 may be a wireless network, a wired network or any combination of wireless, wired and/or other network. For example, network 106 may include, without limitation, wireless LAN, Global System for Mobile Communication (GSM), Personal Communication Service (PCS), Personal Area Network (PAN), D-AMPS, Wi-Fi, Fixed Wireless Data, satellite network, IEEE 802.11a, 802.11b, 802.15.1, 802.11n and 802.11g and/or other wireless network. In addition, network 106 may include, without limitation, telephone line, fiber optics, IEEE Ethernet 802.3, long-range wireless radio, wide area network (WAN) such as WiMax, infrared, Bluetooth™, and/or other similar applications, local area network (LAN), global network such as the Internet. Also, network 106 may enable, a wireless communication network, a cellular network, an Intranet, or the like, or any combination thereof Network 106 may further include one, or any number of the exemplary types of networks mentioned above operating as a stand-alone network or in cooperation with each other.

The VoIP service provider 108 may include one or more VoIP service providers for providing VoIP service over Internet Protocol (IP) network and/or public switch telephone network (PSTN). For example, the VoIP service provider 108 may carry telephony signals (e.g., digital audio) encapsulated in a data packet stream over the Internet Protocol (IP) network. The VoIP service provider 108 may provide direct inward dialing (DID) VoIP services and/or access a VoIP service. For example, the VoIP service provider 108 may include one or more processors to provide VoIP services for the one or more mobile VoIP user agents 102. Further, the VoIP service provider 108 may include one or more databases to store one or more locations associated with the one or more mobile VoIP user agents 102.

Figure 2:
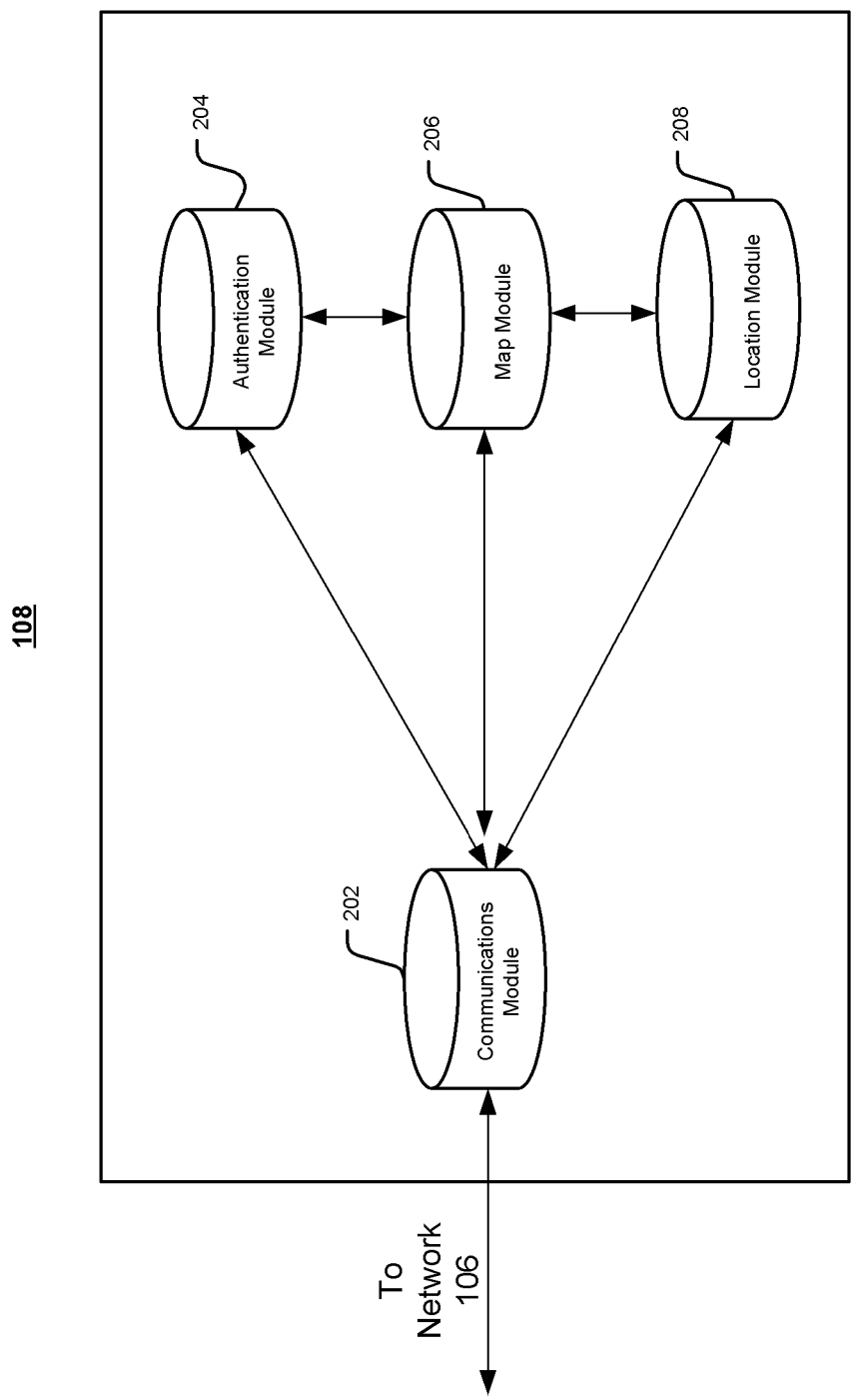
FIG. 2 illustrates a block diagram of a VoIP service provider, in accordance with exemplary embodiments.

FIG. 2 illustrates a block diagram of a VoIP service provider, in accordance with exemplary embodiments. In an exemplary embodiment, the VoIP service provider 108 may receive a location message from the one or more mobile VoIP user agents 102. The VoIP service provider 108 may store a location associated with the one or more mobile VoIP user agents 102. For example, the VoIP service provider 108 may include a communication module 202, an authentication module 204, a map module 206, and a location module 208. It is noted that the modules 202, 204, 206, and 208 are exemplary and the functions performed by one or more of the modules may be combined with that performed by other modules. The functions described herein as being performed by the modules 202, 204, 206, and 208 also may be separated and may be performed by other modules at devices local or remote to the VoIP service provider 108.

The VoIP service provider 108 may communicate with the one or more mobile VoIP user agents 102 via the communication module 202. For example, the communication module 202 may receive one or more signals from the one or more mobile VoIP user agents 102. In an exemplary embodiment, the one or more mobile VoIP user agents 102 may transmit a Registration signal, a Subscribe signal, a Notify signal, an Update signal and/or other signals to identify a location associated with the VoIP user agent 102 to the communication module 202. For example, the one or more mobile VoIP user agents 102 may transmit one or more Registration signals to the VoIP service provider 108 to log into one or more VoIP services. Also, the one or more mobile VoIP user agents 102 may transmit one or more Subscribe signals to the VoIP service provider 108 to subscribe one or more VoIP services. Further, the one or more mobile VoIP user agents 102 may transmit one or more Notify signals to the VoIP service provider 108 to notify a location associated with the one or more mobile VoIP user agents 102. In addition, the one or more mobile VoIP user agents 102 may transmit one or more update signals to the VoIP service provider 108 to update a location associated with the one or more mobile VoIP user agents 102. In an exemplary embodiment, the one or more mobile VoIP user agents 102 may transmit one or more Registration signals, one or more Subscribe signals, one or more Notify signals, one or more Update signals continuously, periodically, and/or intermittently.

Also, the communication module 202 may transmit a location request signal for a location associated with the one or more mobile VoIP user agents 102. The one or more mobile VoIP user agents 102 may process the location request signal and transmit one or more location response signals to the communication module 202. Therefore, the VoIP service provider 108 may identify and/or track a location associated with one or more mobile VoIP user agents 102.

In an exemplary embodiment, the communication module 202 may receive one or more Registration signals from the one or more mobile VoIP user agents 102. The one or more Registration signals may include at least one of the following information, for example, but not limited to, user identification information (e.g., name, address, telephone number), location information, date, time, types of VoIP user device, types of VoIP services provided, transmission frequency, transmission rate, username, password, types of network etc. For example, the one or more user agents 102 may transmit one or more Registration signals when turned on. Also, in the event that the one or more mobile VoIP user agents 102 loses VoIP services with the VoIP service provider 108, the one or more mobile VoIP user agents 102 may transmit one or more Registration signals when the one or more mobile VoIP user agents 102 may be attempting to reestablish a service with the VoIP service provider 108. The one or more mobile VoIP user agents 102 may transmit the one or more Registration signals continuously, periodically, or intermittently. Also, the one or more mobile VoIP user agents 102 may transmit each one or more Registration signals separately and/or in a bundle.

The communication module 202 may transfer the Registration signal to the authentication module 204. For example, the authentication module 204 may identify user identification information contained within the one or more Registration signals and may attempt to authenticate a user 120 using the user identification information. In an exemplary embodiment, user identification information received by the authentication module 204 may be encrypted and decrypted according to one or more security protocols. The authentication module 204 may include one or more processors to process the user identification information to decipher or decrypt the user identification information before authenticating the user 120. Also, the authentication module 204 may include one or more databases to store the user identification information in association with establishing the user identity. For example, the one or more database may be located within the authentication module 204 and/or may be located separately from the authentication module 204. If the user identification information matches an established user identity stored in the authentication module 204, the user 120 may be provided access to the one or more VoIP services provided by the VoIP service provider 108.

In the event that the user identification information contained in the one or more Registration signals may not match an established user identity stored in the authentication module 204, the user 120 may not be allowed to use one or more VoIP services. The authentication process may fail, and the authentication module 204 may transmit a Failure signal to the one or more mobile VoIP user agents 102 and may notify the user 120 of the failure. The Failure Message may ask the user 120 to re-enter and/or retransmit the user identification information. A user 120 may reenter user identification information and may repeat an attempt to re-authenticate.

The authentication module 204 may also limit the number of times a user 120 may try to authenticate into the VoIP service provider 108. The authentication module 204 may enable a user 120 unlimited number of tries to authenticate into the VoIP service provider 108, until either the user 120 authenticates into the VoIP service provider 108 or the user 120 stops attempting. In the event that a user 120 cannot authenticate, or if the user 120 exceeds the number of attempts permitted to authenticate, the authentication process may end.

In the event that the authentication module 204 authenticates the one or more mobile VoIP user agents 102 into the VoIP service provider 108, the authentication module 204 may provide the one or more Registration signals to the map module 206. The map module 206 may determine and/or store location information of the Registration signal associated with the one or more mobile VoIP user agents 102 to map a geographical layout of the one or more mobile VoIP user agents 102. For example, mapping information of the map module 206 may be imported and/or updated by a commercially available mapping sources to visually locate the location of the one or more mobile VoIP user agents 102 on a geographical map. These mapping sources may include Google Maps™, GoogleEarth™, MapQuest™, Yahoo Maps™, or other electronic mapping sources. The geographical location of one or more VoIP service portals 104 may be mapped and/or stored in the map module 206. The geographical location of the one or more service portals 104 may be mapped and/or provided by network architectural designs or network blueprints via network designers, engineers, or other sources. In addition to storing the information identified above, the map module 206 may also determine and record past locations associated with the one or more mobile VoIP user agents 102 to provide an indication of the geographical regions, the one or more mobile VoIP user agents 102 is most likely to be associated with. The map module 206 may provide direction information (e.g., driving direction, flying direction) and/or location information to an emergency provider.

In the event that the authentication module 204 authenticates the one or more mobile VoIP user agents 102 into the VoIP service provider 108, the authentication module 204 may transmit the one or more Registration signals to the location module 208. The location module 208 may include one or more processors to process the one or more Registration signals to determine a geographical information such as the physical address or wireless location, e.g., GPS coordinates or other coordinates of location. Also, the location module 208 may process the one or more Registration signals to determine data from human input (e.g., GPS, geocoded data, street address and/or other types of location information) to determine a location associated with the one or more mobile VoIP user agents 102. The one or more mobile VoIP user agents 102 may communicate from the one or more VoIP service portals 104 to the VoIP service provider 108 via the network 106. The location module 208 may also include one or more databases to store one or more locations associated with the one or more mobile VoIP user agents 102. The location module 208 may provide one or more locations associated with the one or more mobile VoIP user agents 102 to an emergency provider.

The location module 208 may transmit one or more Confirmation signals to the one or more mobile VoIP user agents 102. The one or more Confirmation signals may include one or more locations associated with the one or more mobile VoIP user agents 102 stored in the location module 208. For example, the one or more Confirmation signals may include a street address, GPS coordinates and/or other location identification methods. The one or more mobile VoIP user agents 102 may display the one or more locations stored in the location module 208 to a user 120 associated with the one or more mobile VoIP user agents 102. The user 120 may confirm the accuracy of the one or more locations stored in the location module 208. In the event that the one or more locations stored in the location module 208 is not correct, the user 120 may retransmit and/or input the correct location associated with the one or more mobile VoIP user agents 102.

In an exemplary embodiment, the location module 208 may transmit one or more Location Update signals to the one or more mobile VoIP user agents 102 to request the one or more mobile VoIP user agents 102 to update its location. The location module 208 may transmit the one or more Location Update signals at a predetermined time interval (e.g., every hour, every two hours, every day, every month, etc.). The one or more Location Update signals may request and/or cause the one or more mobile VoIP user agents 102 to transmit one or more Update signals to the VoIP service provider 108 to update a location associated with the one or more mobile VoIP user agents 102.

Figure 3:
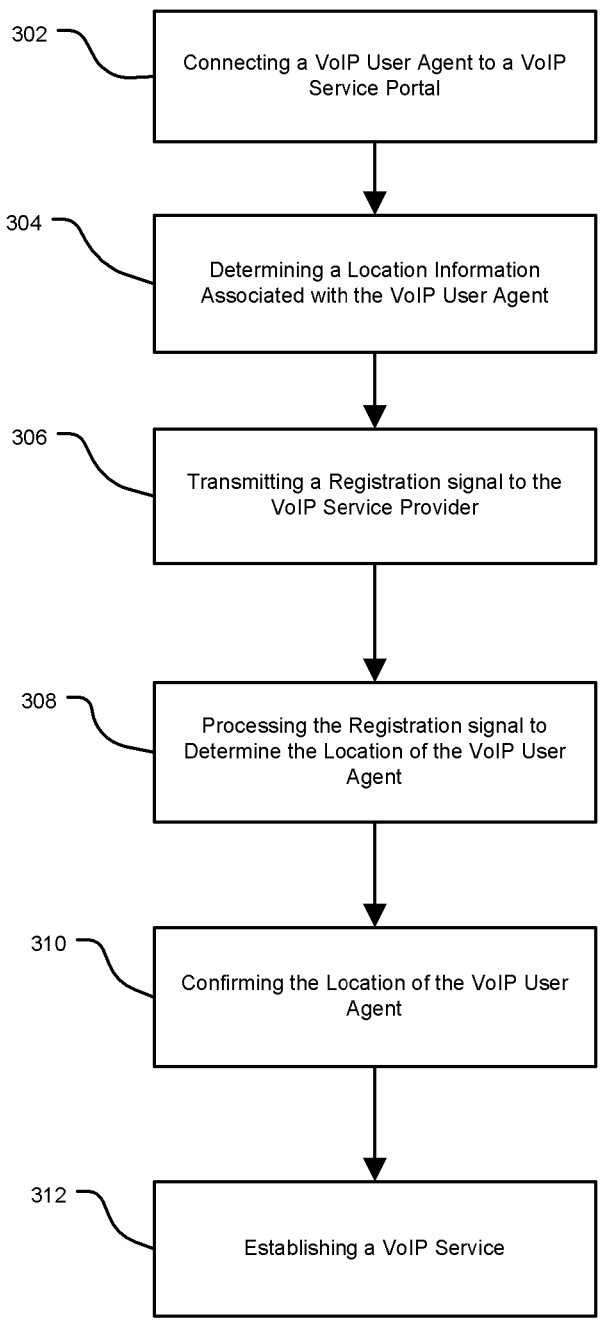
FIG. 3 illustrates a flowchart for locating a VoIP device, in accordance with exemplary embodiments.

FIG. 3 illustrates a flowchart for locating a VoIP device, in accordance with exemplary embodiments. This exemplary method is provided by way of example, as there are a variety of ways to carry out methods disclosed herein. The method 300 shown in FIG. 3 can be executed or otherwise performed by one or a combination of various systems. The method 300 is described below as carried out by the system 100 shown in FIGS. 1 and 2 by way of example, and various elements of the system 100 are referenced in explaining the example method of FIG. 3. Each block shown in FIG. 3 represents one or more processes, methods, or subroutines carried in the exemplary method 300. The method 300 may begin at block 302.

At block 302, a mobile VoIP user agent 102 may be coupled to one or more VoIP service portals 104. For example, the mobile VoIP user agent 102 may be a mobile device (e.g., SIP phones and/or Soft clients) and associated with a user 120. The user 120 may travel with the mobile VoIP user agent 102 to different locations. Also, the user 120 may couple the mobile VoIP user agent 102 to various VoIP service portals 104 (e.g., telephone adaptor, and/or Internet router) located at different locations. The mobile VoIP user agents 102 may automatically initiate a registration process with a VoIP service provider 108. For example, the mobile VoIP user agent 102 may prompt the user 120 to enter user identification information and/or other information necessary to authenticate the user 120 into the VoIP service provider 108. Also, the user 120 associated with the mobile VoIP user agent 102 may manually initiate a registration process with the VoIP service provider 108. The method of 300 may proceed to block 304.

At block 304, the mobile VoIP user agent 102 may determine location information associated with the mobile VoIP user agent 102. For example, the mobile VoIP user agent 102 may include one or more location sensors 110 (e.g., geomagnetic sensor) which may determine the location information associated with the mobile VoIP user agent 102 based at least in part on measurements of the Earth's magnetic field. The measurements of the Earth's magnetic field may include an angle of the Earth's magnetic field and/or a strength of the Earth's magnetic field. The strength of the Earth's magnetic filed may vary across the globe. For example, the Earth's magnetic field is strongest at the poles and weakest at the equator. Also, the angle of the Earth's magnetic field meets the Earth's surface may be unique for a particular position across the globe. The one or more location sensors 110 may determine the location information associated with the mobile VoIP user agent 102. The method of 300 may proceed to block 306.

At block 306, the mobile VoIP user agent 102 may transmit one or more Registration signals to the VoIP service provider 108. For example, the mobile VoIP user agent 102 may transmit the one or more Registration signals to the VoIP service provider 108 via the one or more VoIP service portals 104 and/or a network 106. In an exemplary embodiment, the one or more Registration signals may include the user identification information, the location information and/or other information necessary to authenticate the user 120 into the VoIP service provider 108. The method of 300 may proceed to block 308.

At block 308, the VoIP service provider 108 may process the one or more Registration signals to determine the location of the mobile VoIP user agent 102. For example, the VoIP service provider 108 may authenticate the mobile VoIP user agent 102 based at least in part the user identification information and/or other information necessary to authenticate the user 120. Also, the VoIP service provider 108 may extract the location information contained in the one or more Registration signals to determine the location of the mobile VoIP user agent 102. The VoIP service provider 108 may determine one or more locations associated with the mobile VoIP user agent 102 based at least in part on the extracted location information contained in the Registration signal. The VoIP service provider may store the one or more locations associated with the mobile VoIP user agent 102. The method of 300 may proceed to block 310.

At block 310, the VoIP service provider 108 may confirm the one or more locations associated with the mobile VoIP user agent 102. For example, the VoIP service provider 108 may transmit one or more Confirmation signals to the mobile VoIP user agent 102. The one or more Confirmation signals may include the one or more locations associated with the mobile VoIP user agent 102 stored in the VoIP service provider. Also, the one or more Confirmation signals may prompt the user 120 to confirm the location stored in the VoIP service provider 108 is correct. For example, the location sensor 110 may determine the wrong location information associated with the mobile VoIP user agent 102. Also, the VoIP service provider 108 may determine the wrong location information associated with the mobile VoIP user agent 102 and store the wrong location information. In the event that the location stored in the VoIP service provider 108 is not the correct location associated with the mobile VoIP user agent 102, the mobile VoIP user agent 102 may retransmit the one or more Registration signals. In the event that the location stored in the VoIP service provider 108 is the correct location associated with the mobile VoIP user agent 102, the method of 300 may proceed to block 312.

At block 312, the mobile VoIP user agent 102 may establish a VoIP service with the VoIP service provider 108. For example, the mobile VoIP user agent 102 may transmit one or more Confirmation Response signal to the VoIP service provider 108 to establish a VoIP service. Also, the VoIP service provider 108 may store the location associated with the mobile VoIP user agent 102 and track the location of the mobile VoIP user agent 102. The VoIP service provider 108 may provide the location associated with the mobile VoIP user agent 102 to an emergency provider. Also, the VoIP service provider 108 may provide direction information (e.g., driving direction, flying direction) and/or location information to the emergency provider.

It should be appreciated that exemplary embodiments may be implemented as a method, a data processing system, or a computer program product. Accordingly, exemplary embodiments may take the form of an entirely hardware embodiment, an entirely software embodiment, or an embodiment combining software and hardware aspects. Furthermore, implementations of the exemplary embodiments may take the form of a computer program product on a computer-readable storage medium having computer-readable program instructions (e.g., computer software) embodied in the storage medium. More specifically, implementations of the exemplary embodiments may take the form of web-implemented computer software. Any suitable computer-readable storage media may be utilized including hard disks, CD-ROMs, optical storage devices, magnetic storage devices, or other similar computer readable/executable storage media.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   determining first location information of a VoIP device using one or more geomagnetic sensors associated with the VoIP device, the first location information including at least a magnetic field strength and an angle;

transmitting the first location information to a service provider;

receiving second location information, wherein the second location information is calculated using the first information and data stored in a mapping module, wherein the data stored in the mapping module includes mapping information and location information received from a plurality of VoIP devices; and receiving a confirmation signal, wherein the confirmation signal includes the second location information and is configured to cause the VoIP device to generate a prompt to receive confirmation that the second location information is accurate.

2. The method of claim 1, wherein determining the first location information associated with the VoIP device further comprises a user inputting location information associated with the VoIP device.

3. The method of claim 1, further comprising transmitting user identification information to the service provider.

4. The method of claim 1, further comprising transmitting at least one of a Registration signal, a Subscription signal, a Notify signal and a Update signal to the service provider.

5. A non-transitory computer readable media comprising code to perform the steps of the methods of claim 1.

6. The method of claim 1 wherein the data stored in the mapping module further includes past locations associated with the VoIP device and the second location information is further calculated based on the past locations associated with the VoIP device.

7. The method of claim 1, further comprising receiving at least one of: direction information associated with an emergency provider or location information associated with an emergency provider.

8. A method, comprising:

receiving first location information associated with a VoIP device having one or more geomagnetic sensor, wherein the first location information is determined using the one or more geomagnetic sensors based at least in part on the Earth's magnetic field, the first location information comprising a magnetic field strength and an angle;

determining second location information associated with the VoIP device, the determining comprising calculating the second location information using the first location information and data stored in a mapping module, wherein the data stored in the mapping module includes mapping information and location information received from a plurality of VoIP devices; and storing the second location information in one or more databases; and transmitting a confirmation signal, wherein the confirmation signal includes the second location information and is configured to cause the VoIP device to generate a prompt to receive confirmation that the second location information is accurate to establish a service.

9. The method of claim 8, further comprising transmitting at least one of a location request signal and a location update signal to the VoIP device to request a location associated with the VoIP device.

10. The method of claim 8, further comprising receiving user identification information associated with the VoIP device.

11. The method of claim 10, further comprising authenticating a user based at least in part on the user identification information.

12. The method of claim 8, further comprising mapping a geographical layout of the VoIP device based at least in part on the first location information.

13. A non-transitory computer readable media comprising code to perform the steps of the methods of claim 8.

14. A system, comprising:

a location sensor for determining first location information associated with a VoIP device based at least in part on the Earth's magnetic field, the first location information comprising a magnetic field strength and an angle; and a transceiver for:

transmitting the first location information to a service provider, receiving a confirmation signal, wherein the confirmation signal includes a second location information calculated from the first location information and data stored in a mapping module and is configured to cause the VoIP device to generate a prompt to receive confirmation that the second location information is accurate, wherein the data stored in the mapping module includes mapping information and location information received from a plurality of VoIP devices; and transmitting the confirmation that the second location information is accurate.

15. The system of claim 14, wherein the location sensor is a geomagnetic sensor.

16. The system of claim 14, wherein the location sensor further comprises one or more interfaces configured to input a location information associated with the VoIP device by a user.

17. The system of claim 14, wherein the transceiver transmits user identification information to the service provider.

18. A system, comprising:

a communication module for receiving first location information associated with a VoIP device having one or more geomagnetic sensors, wherein the first location information is determined by the one or more geomagnetic sensors based at least in part on the Earth's magnetic field, the first location information comprising a magnetic field strength and an angle;

a map module comprising at least one processor and storage unit for processing and storing map information including location information received from a plurality of VoIP devices; and a location module comprising at least one processor for calculating second location information associated with the VoIP device using the first location information and the map information, and storing the second location information in one or more databases;

wherein the communication module is further configured to transmit a confirmation signal including the second location information, the confirmation signal being configured to cause the VoIP device to generate a prompt to receive confirmation that the second location information is accurate.

19. The system of claim 18, wherein the communication module is configured to transmit at least one of a location request signal and a location update signal to the VoIP device to request a location associated with the VoIP device.

20. The system of claim 18, wherein the communication module receives user identification information associated with the VoIP device.

21. The system of claim 20, further comprising an authentication module for authenticating a user based at least in part on the user identification information.

22. The system of claim 18, wherein the map module maps a geographical layout of the VoIP device based at least in part on the first location information.

23. The system of claim 18, wherein the communication module receives at least one of a Registration signal, a Subscription signal, a Notify signal and a Update signal associated with the VoIP device.

24. The system of claim 18, wherein the first location information is contained in a Registration signal.

* * * * *